(12) United States Patent
Rao

(10) Patent No.: US 8,270,424 B2
(45) Date of Patent: Sep. 18, 2012

(54) METHOD OF SIGNALING ALLOCATED RESOURCES

(75) Inventor: Anil M Rao, Cedar Knolls, NJ (US)

(73) Assignee: Alcatel Lucent, Paris (FR)

( * ) Notice: Subject to any disclaimer, the term of this patent is extended or adjusted under 35 U.S.C. 154(b) by 384 days.

(21) Appl. No.: 11/591,395

(22) Filed: Nov. 1, 2006

(65) Prior Publication Data

US 2008/0101319 A1    May 1, 2008

(51) Int. Cl.
*H04L 12/28* (2006.01)

(52) U.S. Cl. .................................. 370/431; 455/7; 455/8

(58) Field of Classification Search .................. 455/7, 8; 370/431

See application file for complete search history.

(56) References Cited

U.S. PATENT DOCUMENTS

| | | | | |
|---|---|---|---|---|
| 5,394,433 A | * | 2/1995 | Bantz et al. | 375/132 |
| 6,965,590 B1 | * | 11/2005 | Schmidl et al. | 370/343 |
| 2003/0153276 A1 | * | 8/2003 | Terry et al. | 455/69 |
| 2004/0114549 A1 | * | 6/2004 | Miyoshi | 370/320 |
| 2004/0264420 A1 | * | 12/2004 | Qian et al. | 370/335 |
| 2007/0060178 A1 | * | 3/2007 | Gorokhov et al. | 455/506 |
| 2010/0235705 A1 | * | 9/2010 | Kim et al. | 714/749 |

* cited by examiner

*Primary Examiner* — Marcos Batista
(74) *Attorney, Agent, or Firm* — Capitol Patent & Trademark Law Firm, PLLC

(57) ABSTRACT

Disclosed is a method of signaling hopping locations selected by a scheduling entity using a frequency hopping pattern indicator for indicating hopping locations for at least two re-transmissions. The frequency hopping pattern is selected by the scheduling entity which may have knowledge of all or at least a plurality of scheduled reverse link transmissions or restrictions upon reverse link transmissions, thereby allowing reverse link re-transmissions to be scheduled in a manner compatible with other reverse link transmissions and restrictions. Overall signaling overhead associated with scheduling re-transmissions is reduced through the signaling of a single message which indicates hopping locations for at least two re-transmissions instead of two or more separate messages, wherein each of the two or more separate message indicates a hopping location for an individual re-transmission.

17 Claims, 2 Drawing Sheets

200

| FHPI | HARQ ReTx#1 | HARQ ReTx#2 | HARQ ReTx#3 | HARQ ReTx#4 |
|---|---|---|---|---|
| 0 | 0 | 0 | 0 | 0 |
| 1 | +10 | -20 | -10 | +40 |
| 2 | -15 | +5 | -10 | +30 |
| 3 | +3 | -6 | +2 | -6 |

METHOD OF SIGNALING ALLOCATED RESOURCES

FIELD OF THE INVENTION

The present invention relates generally to wireless communication systems and, in particular, to frequency hopping in wireless communication systems.

BACKGROUND OF THE RELATED ART

Wireless communication systems based on the well-known Universal Mobile Telecommunication System (UMTS) will eventually evolve to a packet data system with an orthogonal frequency division multiple access (OFDMA) air interface. In this evolution, reverse link transmissions of data packets are scheduled. Scheduling reverse link transmissions involves allocating or assigning a set of one or more sub-carriers to a mobile station at every scheduling instance. The sub-carriers allocated to a particular mobile station will be localized in the sense that the allocated sub-carriers are contiguous.

A drawback with localized sub-carrier allocation is that the reverse link transmission is spread over a narrow bandwidth and not spread over a wide bandwidth. Spreading the reverse link transmission over a narrow bandwidth does not allow the reverse link transmission to experience much, if any, frequency diversity. For example, suppose the sub-carriers are modulated onto a carrier with a 5 MHz bandwidth and each sub-carrier has a 15 kHz bandwidth. If a mobile station is allocated 12 contiguous sub-carriers, then that mobile station would only be using a small or narrow portion, i.e., 180 kHz (15 kHz×12), of the 5 MHz carrier bandwidth.

To achieve frequency diversity without de-localizing sub-carrier allocation, frequency hopping is employed for re-transmissions of data packets. An initial data packet transmission will occur over a first set of contiguous sub-carriers. Data packet re-transmissions will occur over different sets of contiguous sub-carriers in the frequency domain thereby allowing frequency diversity to be achieved over re-transmissions.

Frequency hopping may be implemented in a number of ways. One manner of implementing frequency hopping is via a scheduler at a base station or some other entity. In this implementation, the scheduler makes a scheduling decision which determines the sub-carriers to which the mobile station should hop and use for its re-transmission. A separate scheduling decision is made for each re-transmission and in a manner compatible with prior scheduling decisions and/or restrictions. Upon making each scheduling decision, information indicating the locations (or identities) of the sub-carriers being allocated for the re-transmission (also referred to herein as "hopping locations") is signaled from the base station (or other entity in which the scheduler resides) to the mobile station. Signaling the hopping locations each time a re-transmission is necessary increases signaling overhead, which is undesirable because it reduces system capacity.

Another manner of implementing frequency hopping is to use predetermined frequency hopping patterns in which the mobile station will know to hop to a predetermined set of sub-carriers (or location) for its re-transmissions, e.g., mobile station will hop 10 sub-carriers every time it re-transmits a data packet. However, in this implementation, the scheduler does not have control of all scheduling decisions. Scheduling decisions with respect to reverse link re-transmissions are made by the mobile stations and may be incompatible with restrictions and/or scheduling decisions made by the scheduler or other mobile stations.

Accordingly, there exists a need for implementing frequency hopping without sacrificing scheduling control while reducing signaling overhead.

SUMMARY OF THE INVENTION

An embodiment of the present invention is a method of signaling hopping locations selected by a scheduling entity using a frequency hopping pattern indicator for indicating hopping locations for at least two re-transmissions. The frequency hopping pattern is selected by the scheduling entity which, in one embodiment, has knowledge of all or at least a plurality of scheduled reverse link transmissions or restrictions upon reverse link transmissions, thereby allowing reverse link re-transmissions to be scheduled in a manner compatible with other reverse link transmissions and restrictions. Overall signaling overhead associated with scheduling re-transmissions is reduced through the signaling of a single message which indicates hopping locations for at least two re-transmissions instead of two or more separate messages, wherein each of the two or more separate message indicates a hopping location for an individual re-transmission.

An embodiment of the present invention is a method of signaling allocated resources comprising the step of transmitting a scheduling grant indicating sub-carriers allocated for an initial data packet transmission and a data packet re-transmission. The sub-carriers allocated for data packet re-transmission may, in one embodiment, be a hopping location indicating an amount of sub-carriers to hop from the sub-carriers allocated for the initial data packet transmission.

BRIEF DESCRIPTION OF THE DRAWINGS

The features, aspects, and advantages of the present invention will become better understood with regard to the following description, appended claims, and accompanying drawings where:

FIG. 2 depicts a sample 200 illustrating a set of frequency hopping patterns.

DETAILED DESCRIPTION

Figure 1:
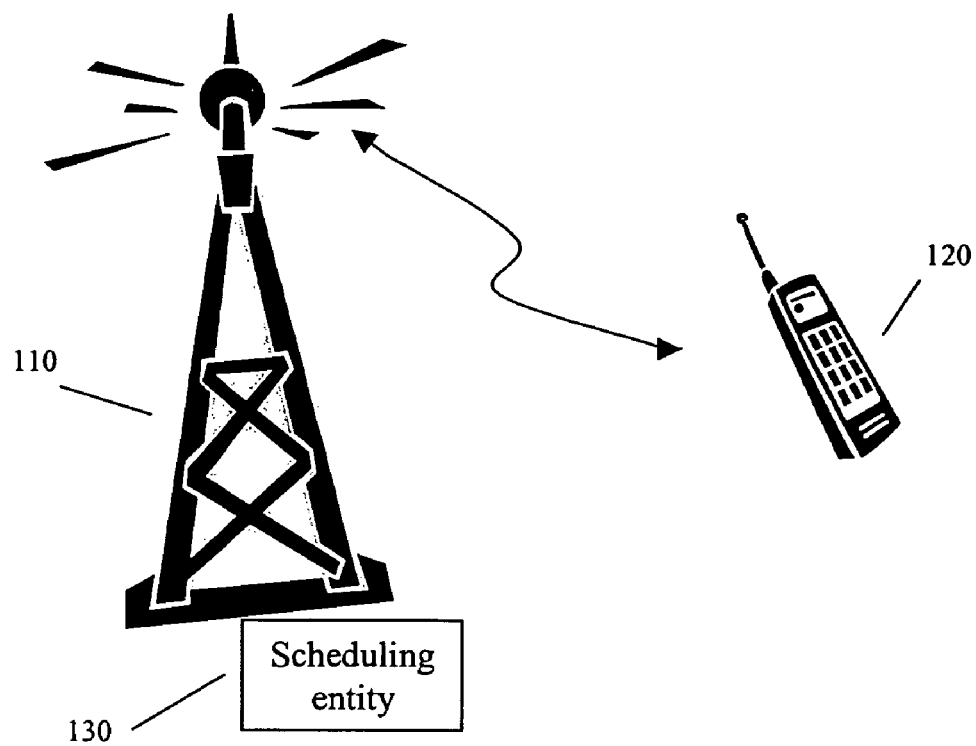
FIG. 1 depicts a wireless communication system comprising a base station and a mobile station used in accordance with one embodiment of the present invention.

FIG. 1 depicts a wireless communication system 100 comprising a base station 110 and a mobile station 120 used in accordance with one embodiment of the present invention. Base station 110 includes a scheduler (or other scheduling entity) 130 for allocating sub-carriers to mobile station 120. Data packets are transmitted between base station 110 and mobile station 120 over an Orthogonal Frequency Division Multiple Access (OFDMA) air interface. All data packet transmissions from mobile station 120 to base station n110, i.e., reverse link, are scheduled transmissions.

Scheduling reverse link data packet transmissions involve scheduler 130 allocating a set of one or more sub-carriers to each mobile station 120 to used for its reverse link transmissions. In one embodiment, the set of allocated sub-carriers include contiguous sub-carriers. The allocated sub-carriers are communicated to mobile station 120 by base station 110 in a scheduling grant or some other message.

Mobile station 120 initially transmits its data packets over the allocated sub-carriers indicated in the scheduling grant. Data packets which were unsuccessfully initially transmitted (or received) are re-transmitted in accordance with a re-transmission scheme. In an embodiment, re-transmissions of the data packets will occur in accordance with a non-adaptive, synchronous Hybrid Automatic ReQuest (HARQ) re-transmission scheme. The HARQ re-transmission scheme being non-adaptive in the sense that transmission parameters do not change on re-transmissions. Examples of transmission parameters include block size, modulation, coding and frequency assignment. The HARQ re-transmission scheme being synchronous in the sense that re-transmissions will occur at known or predetermined times after the initial transmission. For example, re-transmissions will occur 3 or 5 ms after an immediately preceding failed or unsuccessful transmission.

For ease of illustration, the present invention will be described herein with respect to a non-adaptive, synchronous HARQ re-transmission scheme. This should not be construed to limit the present invention to a non-adaptive, synchronous HARQ re-transmission scheme. It should be apparent to a person of ordinary skill in the art to adapt the present invention to other types of re-transmission schemes.

In an embodiment, re-transmissions will occur over sub-carriers determined in accordance with a frequency hopping pattern in order to achieve frequency diversity, wherein the frequency hopping pattern indicates hopping locations for at least two re-transmissions. In one embodiment, the frequency hopping pattern is based on a set of hopping locations. For example, the frequency hopping pattern might indicate a set of hopping locations, such as +10, −20, −10 and +40. If mobile station 120 was allocated sub-carriers f21-f32 (as indicated in the scheduling grant), then mobile station 120 will initially transmit its data packets over sub-carriers f21-f32. If the initial transmission of the data packets was unsuccessful, then mobile station 120 will hop 10 sub-carriers upwards in frequency (i.e., +10) and re-transmit its data packets over sub-carriers f31-f42 (i.e., first re-transmission). If the first re-transmission was unsuccessful, then mobile station 120 will hop 20 sub-carriers downwards in frequency (i.e., −20) and re-transmit its data packets over sub-carriers f11-f22 (i.e., second re-transmission). If the second re-transmission was unsuccessful, then mobile station 120 will hop 10 sub-carriers downwards in frequency (i.e., −10) and re-transmit its data packets over sub-carriers f1-f12 (i.e., third re-transmission), and so on.

In another embodiment, the frequency hopping pattern is based on an algorithm. In yet another embodiment, the frequency hopping pattern is based on a hopping sequence generated by a random or pseudo-random number generator. In this embodiment, base station 110 includes a random or pseudo-random number generator which generates a same hopping sequence as another random or pseudo-random number generator at mobile station 120.

Scheduler 130 determines the frequency hopping pattern to be used by mobile station 120. Several factors may be considered by scheduler 130 when determining the frequency hopping pattern for mobile station 120. One factor involves prior scheduling decisions and/or restrictions. Scheduler 130 would select a frequency hopping pattern for each mobile station 120 in a manner which is compatible with prior scheduling decisions and/or restrictions. For example, if the first, second, third and fourth re-transmissions for mobile station 120 were to occur at times $t_{re-tx1}$, $t_{re-tx2}$, $t_{re-tx3}$ and $t_{re-tx4}$, respectively, and sub-carriers f30-f39 have been reserved for use by one or more other mobile stations at times $t_{re-tx1}$, $t_{re-tx2}$, $t_{re-tx3}$ and $t_{re-tx4}$, then scheduler 130 would select a frequency hopping pattern for mobile station 120 which not involve any of its re-transmissions over sub-carriers f30-f39. Or if sub-carriers f0-f20 are reserved for use as control channels every 5 ms, then scheduler 130 would select a frequency hopping pattern for mobile station 120 which would not involve any of its re-transmissions over sub-carriers f0-f20 when such sub-carriers are being used as control channels.

Another factor for selecting a frequency hopping pattern is channel quality. If good channel quality exists between base station 110 and mobile station 120, then scheduler 130 may decide to have mobile station 120 only hop over a short distance, e.g., a few sub-carriers, to a different set of sub-carriers for its re-transmissions. Alternately, if good channel quality exists between base station 110 and mobile station 120, then scheduler 130 may decide not to have mobile station 120 hop at all, i.e., mobile station 120 uses the same sub-carriers for its initial transmission and re-transmissions. For example, if the channel quality is over a certain threshold value, then a frequency hopping pattern is selected in which mobile station 210 will not hop for re-transmissions.

One other factor for selecting a frequency hopping pattern might involve interference mitigation techniques being implemented, if at all, in wireless communication system 100 or a location of mobile station 120. For example, an interference mitigation technique might restrict mobile stations near an edge of a cell, i.e., geographical coverage area associated with base station 110, to using a certain set of sub-carriers. A frequency hopping pattern would be selected by scheduler 130 such that mobile stations near the edge of a cell would only transmit over that set of sub-carriers.

After a frequency hopping pattern is selected, an indication of the selected frequency hopping pattern (also referred to herein as "frequency hopping pattern indicator" or "FHPI") is signaled or communicated to mobile station 120 by base station 110 such that mobile station 120 will know what frequency hopping pattern, if any, to use for its re-transmissions. In one embodiment, the indication of the selected frequency hopping pattern may be the actual selected frequency hopping pattern. For example, the FHPI may include +10 and −20 for indicating to mobile station 120 to hop upwards 10 sub-carriers for its first re-transmission and downwards 20 sub-carriers for its second re-transmission. Note that a single FHPI will indicate hopping locations for at least two re-transmissions. Thus, information regarding the hopping locations for at least two re-transmissions can be signaled in a single message. In the prior art, at least two separate messages would need sent in order to indicate the hopping locations for at least two re-transmissions. Thus, this embodiment will reduce overall signaling requirements associated with two or more re-transmissions.

In another embodiment, the FHPI is an index to a particular frequency hopping pattern in a set of frequency hopping patterns. For example, both base station 110 (or scheduling entity 130) and mobile station 120 utilize, or is aware of, a common set of frequency hopping patterns. Each of the frequency hopping patterns in the set is associated with an index or reference number. Upon selecting the frequency hopping pattern for mobile station 120 to use for its re-transmissions, base station 110 signals an indication of the index or reference number to mobile station 120. Mobile station 120 would then determine which frequency hopping pattern in the set to use for its re-transmission based on the indication of the index or reference number.

Note that, in this embodiment, the signaling required for indicating the selected frequency hopping pattern is fairly minimal. Base station 110 only needs to communicate to mobile station 120 the index or reference number associated with the selected frequency hopping pattern instead of the entire frequency hopping pattern.

FIG. 2 depicts a sample table 200 illustrating a set of frequency hopping patterns. Table 200 includes a frequency hopping pattern index (FHPI) and a frequency hopping pattern, wherein the frequency hopping pattern comprises a hopping sequence for the first, second, third and fourth HARQ re-transmission. For FHPI=2, mobile station 120 would hop −15, +5, −10 and +30 sub-carriers for its first, second, third and fourth re-transmissions, respectively. For FHPI=0, mobile station 120 would not hop for its re-transmissions.

Base station 110 may indicate to mobile station 120 the selected frequency hopping pattern, for example, at any time prior to a first re-transmission. In one embodiment, the FHPI (or some other indicator which indicates to mobile station 120 what frequency hopping pattern it should use in the event re-transmissions are necessary) is included in the scheduling grant. Note that, in this embodiment, the frequency hopping pattern may indicate a hopping location for one re-transmission or hopping locations for multiple re-transmissions. Alternately, the indication may be sent in a separate message after or concurrent with the scheduling grant.

The present invention have been described herein with reference to certain embodiments. This should not be construed to limit the present invention to these embodiments. Other embodiments and combinations of embodiments are possible. For example, the present invention may be applied to scheduled transmissions from base station 110 to mobile station 120, i.e., forward link. Therefore, the spirit and scope of the present invention should not be limited to the description of the embodiments contained herein.

The invention claimed is:

1. A method of signaling a plurality of sub-carrier frequency locations in a wireless communication system comprising the step of:
    transmitting, by a single scheduling grant, a sub-carrier frequency pattern indicator for a sub-carrier frequency pattern selected by a scheduling entity, wherein the selected sub-carrier frequency pattern indicates a first set of sub-carrier frequency locations for an initial transmission and different sets of sub-carrier frequencies for at least two re-transmissions by a first receiving entity, the sub-carrier frequency pattern indicator being selected based on scheduling restrictions due to prior scheduling decisions for a plurality of receiving entities, the scheduling entity having knowledge of frequency-use assignment for a plurality of transmissions from a transmitting entity to the plurality of receiving entities.

2. The method of claim 1, wherein the sub-carrier frequency pattern indicator indicates a different, predetermined set of sub-carrier frequency locations for the initial transmission and each of the at least two re-transmissions.

3. The method of claim 1, wherein the sub-carrier frequency pattern indicator is selected based on a location of a first receiving entity.

4. The method of claim 1, wherein the sub-carrier frequency pattern indicator is selected based on an interference mitigation technique implemented in the wireless communication system.

5. The method of claim 1, wherein the sub-carrier frequency pattern indicator is selected based on channel quality between a base station and a mobile station.

6. The method of claim 5, wherein the selected sub-carrier frequency pattern indicator indicates to the mobile station not to move to a different set of sub-carrier frequencies when the channel quality is above a threshold value.

7. The method of claim 1, wherein the sub-carrier frequency pattern indicator was transmitted as a part of a scheduling grant which indicates resources allocated to a mobile station for initially transmitting a data packet.

8. The method of claim 1, wherein the wireless communication system utilizes an orthogonal frequency division multiple access air interface for communication between a base station and a mobile station.

9. The method of claim 8, wherein the scheduling entity is located at the base station, the reverse link transmissions are scheduled by the scheduling entity, and the sub-carrier frequency pattern indicator is transmitted from the base station to the mobile station.

10. The method of claim 1, wherein the sub-carrier frequency pattern indicator is an index to a table associating indicies to sub-carrier frequency patterns, and the table being known to the scheduling entity and a mobile station to which the indicator of sub-carrier frequency pattern is being transmitted.

11. The method of claim 1, wherein the sub-carrier frequency pattern indicator is being transmitted prior to any of the at least two re-transmissions.

12. The method of claim 1, wherein the wireless communication system utilizes a non-adaptive, synchronous hybrid automatic request re-transmission scheme.

13. A method of signaling allocated resources in a wireless communication system comprising the step of:
    transmitting from a base station a single scheduling grant indicating a first set of sub-carrier frequencies allocated for an initial reverse-link data packet transmission and different sets of sub-carrier frequencies allocated for at least two reverse-link data packet re-transmissions, the scheduling grant based on at least scheduling restrictions due to prior scheduling decisions for a plurality of receiving entities.

14. The method of claim 13, wherein the set of sub-carrier frequencies allocated for the data packet re-transmission is indicated using a hopping location relative to the set of sub-carrier frequencies allocated for the initial data packet transmission.

15. The method of claim 13 comprising the additional step of:
    prior to transmitting the scheduling grant, selecting a hopping location for the data packet re-transmission from a set of predetermined hopping locations.

16. The method of claim 13 comprising the additional step of:
    prior to transmitting the scheduling grant, selecting a hopping location for the data packet re-transmission based on a mobile station location.

17. The method of claim 13 comprising the additional step of:
    prior to transmitting the scheduling grant, selecting a hopping location for the data packet re-transmission based on channel quality between a base station and a mobile station.

* * * * *